Patented Oct. 5, 1937

2,095,126

UNITED STATES PATENT OFFICE 2,095,126

METHOD OF MAKING 2,4-DIALKYLQUIN-OLINES AND OF DECOMPOSING AMINE-KETONE REACTION PRODUCTS

David Craig, Silver Lake, Ohio, assignor to The B. F. Goodrich Company, New York, N. Y., a corporation of New York No Drawing. Application August 11, 1936,
Serial No. 95,432

8 Claims. (Cl. 260—38)

This invention relates to an improved method for making substituted quinolines, particularly those in which there are hydrocarbon radicals as substituent groupings in the 2- and 4-positions. Hitherto these materials have been expensive and troublesome to prepare in the pure state even by the method disclosed some years ago in German Patents 363,582 and 363,583 (May 22, 1922; Frdl., IV, 520) in which reaction products of aliphatic ketones with primary aryl amines are pyrolyzed at a relatively high temperature or heated with hydrogen chloride at a lower temperature. This process was developed further by Clarke and Taylor, U. S. Patent 1,701,144, Feb. 5, 1929. That older methods for the preparation of 2,4-dimethylquinoline have not been satisfactory is shown by the fact that as late as 1935 a tedious and costly method was published for its preparation from 2-hydroxy-pentanone-4 and aniline (see Bull. Soc. Chim. (5) 2, 95 (1935)).

By contrast, the method described herein is economical whether operated on the large or small scale and is very easily carried out. Briefly, it consists in heating a dihydroquinoline, such as 2,2,4 - trimethyl - 1,2 - dihydroquinoline (or even crude reaction products containing substituted dihydroquinoline compounds and prepared from primary aromatic amines and aldehydes or ketones) in the presence of an N-metal substituted amide as a catalyst. The catalyst may be the metal amide derived from the quinoline compound undergoing treatment, or may be another amide capable of giving up the metal to the quinoline compound under the conditions of the reaction. The catalyst brings about a reduction in the chemical saturation of the quinoline compound, usually by the elimination of hydrogen or of a hydrocarbon of the paraffin or olefinic series and the formation of a double bond joining the nitrogen and the adjacent carbon atom.

The formation of 2,4-dimethylquinoline from the reaction product of acetone and aniline by the process of this invention can be explained on a logical basis if we accept the view of Reddelein and later workers, that the material called "acetone anil" is actually 2,2,4-trimethyl-1,2-dihydroquinoline (Ber., 65, 1511 (1932); J. Chem. Soc., 1327 (1933); Ber., 66, 59 (1933); J. Am. Chem. Soc., 55, 2805 (1933)). Although the mechanism of the reaction is not entirely clear the formation of the dihydroquinoline from acetone and aniline can be represented by Equation I.

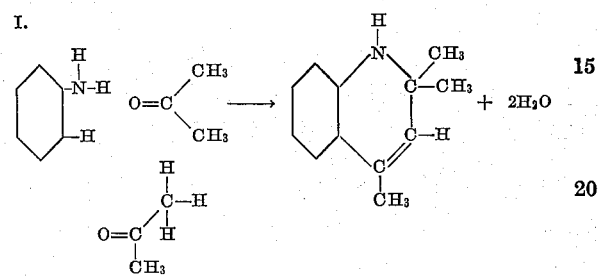

The reaction of this compound with a metal amide such as sodamide then can be represented by Equations II, III, and IV. The sodium derivative (B) is apparently regenerated by the mechanism illustrated in Equation IV with the formation of 2,4-dimethylquinoline (D) and is then free to repeat the cycle until substantially all of the acetone-aniline reaction product (A) is converted.

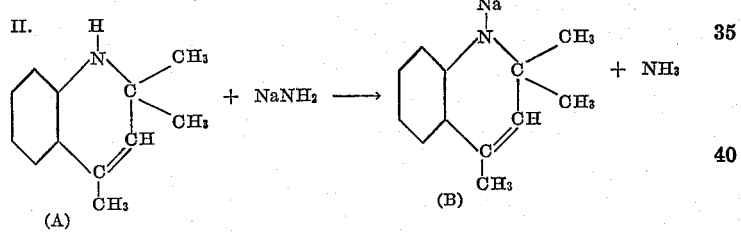

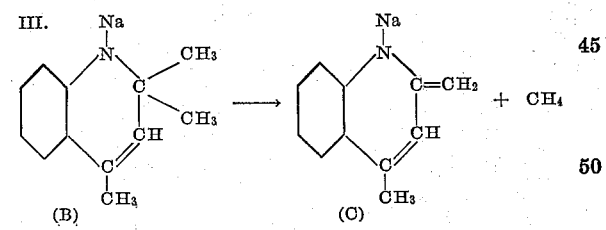

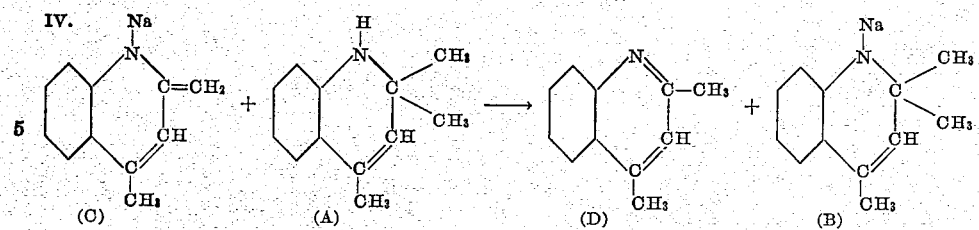

The exact chemical structure of many of the reaction products of primary aromatic amines with carbonyl compounds, such as aldehydes or ketones, is not known. It is known that there is a strong tendency to form products having the empirical composition of substituted dihydroquinolines, the number and character of the substituents depending on the particular aldehyde or ketone or mixture thereof which is employed in each case. The lowest aldehyde, formaldehyde, is an exception and does not by itself form quinoline compounds. The reaction which gives rise to the substituted dihydroquinolines requires two molecules of the simple saturated aldehydes or ketones for each molecule of primary aromatic amine, but the two may be combined in advance to form aldols or their dehydration products, which function as the equivalents of the simple aldehydes or ketones. Thus one mole of aniline reacts with two of acetaldehyde or with one of acetaldol or with one of crotonaldehyde to form a product empirically:

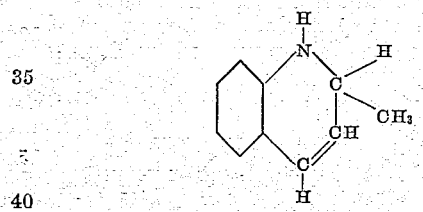

Further, diacetone alcohol or mesityl oxide may be considered as equivalents for acetone in the reaction as is illustrated by Equation V for diacetone alcohol.

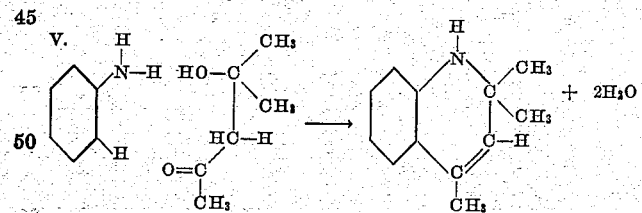

Higher aldehydes and ketones react in an analogous manner. Moreover reactions of the same type occur when two or more different ketones or two or more different aldehydes react with amines at the same time or when mixtures of aldehydes and ketones react with amines.

In some cases these dihydroquinoline-containing reaction products of primary aromatic amines with carbonyl compounds contain large or even preponderant proportions of polymeric compounds. For example, when aniline is reacted with acetaldehyde, a dimer can be formed, which is believed to have the formula:

When such polymeric compounds are treated by the process of this invention the dihydroquinoline nucleus is apparently converted to a quinoline nucleus. The other portion of the molecule containing a tetrahydroquinoline nucleus is unchanged.

Any of the dihydroquinoline compounds described above, whether in a pure state or as more or less crude reaction products, may be converted to corresponding quinoline compounds by heating in the presence of an N-metal substituted amide. If the amide used as a catalyst is to be formed from the quinoline compound itself, it may be formed either by adding the free metal, preferably together with a trace of copper compound or other material which facilitates the formation of metal amides, or by adding a suitable compound of the metal capable of reaction with the quinoline compound, such as a metal hydride. If the amide is formed from some other nitrogeneous base, it may be formed separately and added either alone or in solution in a suitable solvent. Examples of suitable catalysts are sodamide, sodium anilide, potassium amide, magnesium anilide, magnesium nitride, aluminum anilide, iodo magnesium anilide and calcium amide. It is believed that these metal amides function as carriers of the metal and give it up to the quinoline compounds before or during the reaction involved in this invention.

As a specific example of one embodiment of the invention 2,2,4-trimethyldihydroquinoline is prepared by the reaction of acetone with aniline (see J. Am. Chem. Soc., 55, 2806 (1933)). For example, a mixture of 4650 g. (50 moles) of aniline and 127 cc. of concentrated hydrochloric acid (1.5 moles HCl) is placed in a 12-liter flask and maintained at 110° C. A total of 17,000 g. of acetone is allowed to flow through the mixture over a period of 5 hours. The vapors issuing from the reacting mixture are condensed and distilled. The acetone thus recovered is returned as part of the 17,000 g. Aniline present in the condensate readily separates from the water and is also returned to the reaction flask.

The reaction mixture is neutralized by boiling with an aqueous solution of 100 g. of soda ash. The oil is separated and fractionally distilled in vacuo. Aniline (boiling up to 110° at 15 mm.) is recovered for reuse. The residue in the flask weighs about 350 g. and consists of 68% of the monomeric 2,2,4-trimethyldihydroquinoline and 31% of the polymeric material. These latter materials are separated by continuing the vacuum fractionation. The pure monomer boils at 116° C. at a pressure of 5 mm. of mercury and has a setting point of 25° C. The polymers are separated into a fraction boiling at 220° to 240° C. at 2 mm. (probably a dimer) and a small amount of a non-volatile brittle resin.

346 g. (2 moles) of the 2,2,4-trimethyldihydroquinoline is refluxed at 220°–230° C. with a freshly prepared solution of 4.6 g. (0.2 mole) sodium in 56 g. (0.6 mole) of aniline. At the beginning, methane is evolved but at the end of 5 hours the evolution is completed. The mixture is cooled and washed with water if desired. In most cases with such small amounts of alkali it is not necessary to wash with water. The product, after the major part of the aniline has been distilled off along with a small amount of the 2,4-dimethylquinoline, is found to boil at approximately 90° C. at a pressure of 1 mm. The yield is about 261 g. The 2,4-dimethylquinoline is sufficiently pure for many purposes. It may be further purified by dissolving in dilute hydrochloric acid and extracting the solution with benzene to remove small amounts of weak bases such as diphenylamine, and then adding a strong solution of zinc chloride which precipitates the dimethylquinoline as a nearly insoluble zinci hydrochloride (British Patent 276,156; Chem. Zentr., 1928, II, 2287). After cooling, this is filtered off, washed with a little water and finally decomposed with a mixture of sodium hydroxide and sodium cyanide to yield the free base. If the product is then distilled, it is obtained colorless in a yield of about 209 g. or 68%. Similar results are obtained by substituting magnesium anilide for the sodium anilide.

As a further example, 50 g. of the brittle resinous polymeric dihydroquinoline from the above described acetone aniline reaction, distilling at 220°–240° at 2 mm., is heated to 350° C. with 0.5 g. of sodamide. A combustible gas is evolved vigorously. After 20 minutes the temperature is raised to 410° for a few minutes. The main product distils at approximately 215°–225° at 2.5 mm. (yield 33 g.). It gives analytical results satisfactory for a compound having the empirical formula of $C_{23}H_{26}N_2$ as shown by the following table:

| | Percentage found | Calcd. for $C_{23}H_{26}N_2$ |
|---|---|---|
| C | 83.0 | 83.6 |
| H | 8.08 | 7.94 |
| N | 8.44 | 8.48 |

The volume of gas evolved during the reaction is approximately half the volume evolved when an equal weight of the dihydroquinoline is used as in the first example. Inasmuch as 2,2,4-trimethyl-1,2,3,4-tetrahydroquinoline prepared by reduction of the dihydroquinoline does not evolve as gas when refluxed with its sodium derivative, it is believed that the reaction involves only the dihydroquinoline nucleus, as indicated in Equation VI:

VI.
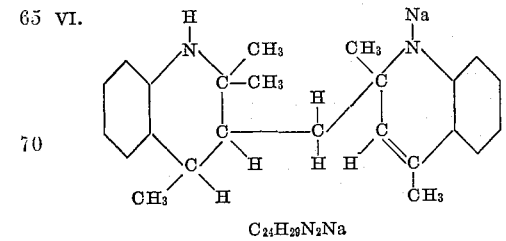 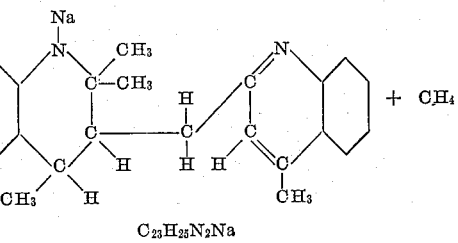

As a third example, 45 g. of the reaction product of p-phenetidine and acetone of B. P. 130°–140° at 3½ mm. is heated to reflux with 0.25 g. of sodamide for 2.5 hours. A combustible gas is evolved during this time. The main product is 6-ethoxy 2,4-dimethylquinoline which may be purified by distillation and crystallization from hexane. It melts at 85°–86°.

It is to be understood that the scope of the invention is not limited by the examples given, and many variations of it will be apparent to those skilled in the art. Instead of the amine-ketone reaction products mentioned, other dihydroquinolines prepared from primary aromatic amines such as an amino hydrocarbon substituted benzene or a naphthylamine or an amino diaryl ether and a ketone such as methyl ethyl ketone, diethyl-ketone, methyl propyl ketone, mesityl oxide, methyl vinyl ketone and the like or the various aldehydes or mixtures of aldehydes and ketones can be used. It is accordingly to be understood that it is not intended to limit the scope of the invention except as may be required by the prior art and as indicated in the appended claims.

I claim:
1. The method of producing 2,4-dimethylquinoline which comprises heating 2,2,4-trimethyl dihydroquinoline with an amide of a light metal.
2. The method of producing a 2,4-substituted quinoline which comprises heating a substituted dihydroquinoline-containing reaction product of a primary aromatic amine and an aliphatic ketone with an amide of a light metal.
3. The method of preparing a substituted quinoline which comprises heating a 2-alkyl-substituted dihydroquinoline with a metallic amide.
4. The method of preparing 2,4-dimethylquinoline which comprises heating 2,2,4-trimethyl-dihydroquinoline with sodium anilide.
5. The method of preparing a 2,4-substituted quinoline which comprises heating a substituted dihydroquinoline-containing aliphatic ketone-aromatic amine reaction product with a magnesium amide.
6. The method of preparing 2,4-dimethyl-6-ethoxyquinoline which comprises heating a substituted dihydroquinoline-containing p-phenetidine-acetone reaction product with sodium anilide.
7. The method of preparing a substituted quinoline which comprises heating a substituted dihydroquinoline-containing reaction product of a primary aromatic amine and at least one member containing more than one carbon atom of the group consisting of aliphatic aldehydes and ketones with a metallic amide.
8. The method of preparing a quinoline which comprises heating a reaction product of a primary aromatic amine with at least one member containing more than one carbon atom of the group consisting of aliphatic aldehydes and ketones, such product containing a dihydroquinoline and an alkali metal dissolved therein.

DAVID CRAIG.